United States Patent
Netsu et al.

(10) Patent No.: US 6,747,943 B2
(45) Date of Patent: *Jun. 8, 2004

(54) OPTICAL RECORDING MEDIUM AND DISC CARTRIDGE

(75) Inventors: Naohiro Netsu, Chiba (JP); Yoshitaka Aoki, Kanagawa (JP); Tetsu Watanabe, Tokyo (JP); Kazuhiko Fujiie, Kanagawa (JP); Yasuaki Maeda, Kanagawa (JP); Takuya Kaeriyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/040,205

(22) Filed: Oct. 29, 2001

(65) Prior Publication Data

US 2002/0054566 A1 May 9, 2002

Related U.S. Application Data

(62) Division of application No. 09/399,255, filed on Sep. 20, 1999.

(30) Foreign Application Priority Data

Jun. 22, 1999 (JP) .......................................... P11-176029

(51) Int. Cl.$^7$ ............................................. G11B 23/03
(52) U.S. Cl. ..................................................... 369/282
(58) Field of Search ............................. 369/282, 98.08, 369/99.05, 99.12, 291, 290, 133; 428/64.1, 64.2, 65.1, 65.2

(56) References Cited

U.S. PATENT DOCUMENTS

| | | | |
|---|---|---|---|
| 5,504,735 A | * 4/1996 | Ota et al. .................... | 369/282 |
| 5,541,910 A | * 7/1996 | Tanaka et al. ............... | 369/290 |
| 5,608,710 A |   3/1997 | Minemura et al. ........... | 369/116 |
| 5,822,162 A |  10/1998 | Tannert ...................... | 366/133 |
| 5,822,297 A |  10/1998 | Fujisawa .................... | 369/291 |
| 5,858,613 A |   1/1999 | Monden et al. ........ | 430/270.16 |
| 5,859,834 A | * 1/1999 | Takahashi et al. .......... | 369/290 |
| 5,958,649 A |   9/1999 | Hirotsune et al. ..... | 430/270.13 |
| 5,987,004 A | * 11/1999 | Suwabe ..................... | 360/133 |
| 5,999,513 A | * 12/1999 | Arakawa et al. ............ | 369/282 |
| 6,154,441 A | * 11/2000 | Sandstrom et al. ......... | 369/282 |

FOREIGN PATENT DOCUMENTS

| | | |
|---|---|---|
| EP | 0358269 | 3/1990 |
| EP | 0368347 | 5/1990 |
| EP | 0472414 | 2/1992 |

(List continued on next page.)

*Primary Examiner*—Tianjie Chen
(74) *Attorney, Agent, or Firm*—Sonnenschein, Nath & Rosenthal LLP

(57) ABSTRACT

An optical recording medium is provided which has a substrate and a signal recording layer provided on the substrate and in which an information signal is recorded in the form of microscopic pits. A light beam is focused on the signal recording layer and some change of the light beam carried by a return light from the signal recording layer is detected to read the information signal recorded on the signal recording layer. The optical recording medium has a diameter of 65 mm or less and a thickness of 0.4 to 0.7 mm. An information signal recording area extends outwardly from a radial position of 12.5 mm or less from the center of the medium. The ratio in area between the information signal recording area and non-signal recording area is 3.4 or more. The storage capacity of this medium is 2 gigabytes or more. The optical recording medium has formed at the center thereof a center hole around which an annular table-abutment convexing to one side of the medium is formed. A magnetic-clamping hub is installed in the center hole and thus the medium is magnetically clamped to a rotation driving mechanism of an optical recording and/or reproducing apparatus. The compactness and high density of recording of the optical recording medium will contribute greatly to a further compact structure of a recording and/or reproducing apparatus in which the medium is to be used.

2 Claims, 10 Drawing Sheets

FOREIGN PATENT DOCUMENTS

| | | |
|---|---|---|
| EP | 0472443 | 2/1992 |
| EP | 0690445 | 1/1996 |
| EP | 0883117 | 12/1998 |
| JP | 03086987 | 4/1991 |
| JP | 08087749 | 4/1996 |
| JP | 09237442 | 9/1997 |

* cited by examiner

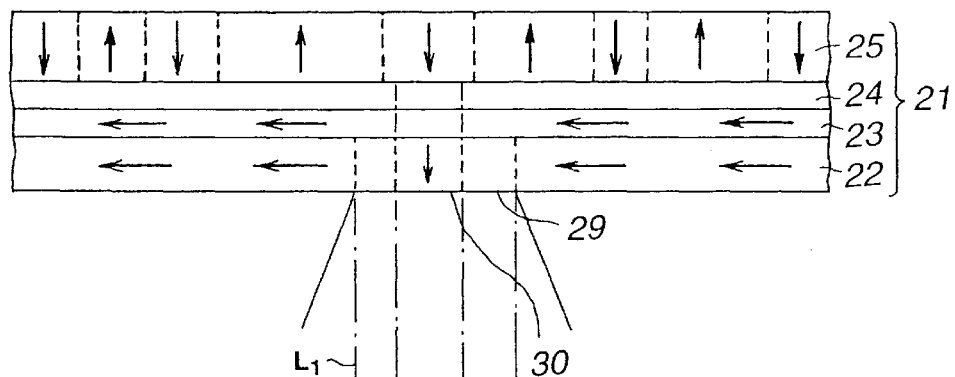
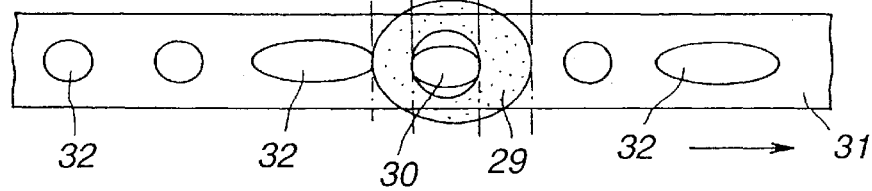
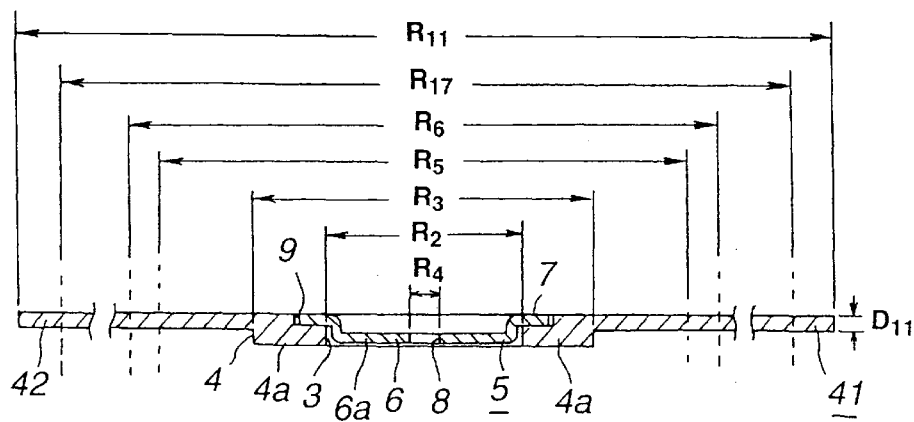
FIG.7

OPTICAL RECORDING MEDIUM AND DISC CARTRIDGE

RELATED APPLICATION DATA

This application is a divisional of co-pending application Ser. No. 09/399,255, filed Sep. 20, 1999. The present and foregoing applications claim priority to Japanese Application No. P11-176029, filed on Jun. 22, 1999. All of the foregoing applications are incorporated herein by reference to the extent permitted by law.

BACKGROUND OF THE INVENTION

The present invention relates to an optical recording medium including a substrate and a signal recording layer provided on the substrate and in which an information signal recorded on the signal recording layer is reproduced optically or by detecting a change of the reflected light focused onto the signal recording layer, and to a disc cartridge encasing the optical recording medium.

As one of the conventional recording media for audio and video information, optical discs, from which recorded information is read using a light beam or to which information is written using a light beam, are widely used. Since such an optical disc is formed from a single plate-like substrate, it can easily be handled and has a larger storage capacity than other recording media such as magnetic tapes, etc. Therefore, the optical discs are widely used as media for recording audio and video information, computer-processed data, etc.

Information processing units, such as computers, have been designed more and more compact with an increasingly smaller internal space of installation for a recording and/or reproducing apparatus using an optical recording medium such as an optical disc or the like. That is, there is a demand for a smaller design of such a recording and/reproducing apparatus.

There are various types of portable or carry-on recording and/or reproducing apparatuses for recording and/or reproduction of audio and video information. For a higher portability, it is also demanded that the apparatuses be of a more compact design.

For such a smaller recording and/or reproducing apparatus, a recording medium used in the apparatus should be correspondingly smaller while having a larger storage capacity.

SUMMARY OF THE INVENTION

It is therefore an object of the present invention to provide a novel optical recording medium designed smaller while having a larger storage capacity, and a disc cartridge in which the optical recording medium is encased.

It is another object of the present invention to provide an optical recording medium having a larger storage capacity while contributing to a more compact design of a recording and/or reproducing apparatus in which the optical recording medium is used, and a disc cartridge encasing the optical recording medium.

It is a further object of the present invention to provide an optical recording medium designed smaller and positively mountable on a rotation driving mechanism to be rotatable along with the rotation driving mechanism, and a disc cartridge encasing the optical recording medium.

In an embodiment, an optical recording medium according to the present invention includes a substrate and a signal recording layer provided on the substrate, an information signal being recorded on the signal recording layer. The optical recording medium has a diameter of 65 mm or less and a thickness of 0.4 to 0.7 mm. An information signal recording area extends outwardly from a radial position of 12.5 mm or less from the center of the medium. A ratio between the information signal recording area and a non-recording area is 3.4 or more. A storage capacity is at least 2 GB (gigabytes) or more.

The above optical recording medium has formed at the center thereof a center hole around which there is formed an annular table-abutment being convex to one side of the medium and in which a hub or clamping plate is fixed.

In an embodiment, an optical recording medium according to the present invention includes a substrate and a signal recording layer provided on the substrate, wherein an information signal recorded on the signal recording layer is reproduced by detecting a change of the reflected light focused onto the signal recording layer. The optical recording medium has a diameter of over 38 mm and under 52 mm and a thickness of 0.4 to 0.7 mm. An information signal recording area extends outwardly from a radial position of 12.5 mm or less from the center of the medium. A storage capacity is at least 1 GB or more.

The above optical recording medium has formed at the center thereof a center hole around which there is formed an annular table-abutment being convex to one side of the medium and in which a hub or clamping plate is fixed.

In an embodiment, an optical recording medium according to the present invention has an annular table-abutment for placement on a disc table of a rotation driving mechanism, and a hub which is to be attracted by a magnet disposed on the disc table, whereby the medium can be rotated along with the disc table.

In an embodiment, an optical recording medium according to the present invention is a read-only optical recording medium. It includes a substrate, formed to a thickness of 0.4 to 0.6 mm by injecting resin within a mold prepared by stamping a stamper having formed thereon a pit pattern in which the recording track pitch and smallest-pit length are about 1.4 times larger than those in a first optical recording medium with a storage capacity of at least 2 GB including a substrate, and a signal recording layer provided on the substrate, and in which information signal recorded on the signal recording layer is reproduced by detecting a change of the reflected light focused onto the signal recording layer; and a light-transparent sheet which is 0.05 to 0.1 mm in thickness and having on one side thereof a pit pattern, formed by thermally stamping a pit-pattern stamper, where a signal recording layer is formed. In the optical recording medium, the substrate and sheet are joined to each other with their respective pit-pattern sides placed in a face-to-face relation through a light-transparent layer of 20 to 35 $\mu$m. The first optical recording medium having a diameter of 65 mm or less and a thickness of 0.4 to 0.7 mm, an information signal recording area defined thereon extending outwardly from a radial position of 12.5 mm or less from the center of the medium, a ratio in diametrical length of 3.4 or more between the information signal recording area and a non-recording area, and a storage capacity of at least 2 GB. It has a diameter of 65 mm or less and a thickness of 0.4 to 0.7 mm. An information signal-recorded area defined thereon extends outwardly from a radial position of 12.5 mm or less from the center of the medium. A storage capacity is a half or less of that of the first optical disc recording medium.

In an embodiment, the optical recording medium is a read-only type. It has a diameter of over 38 mm and under 52 mm and a thickness of 0.4 to 0.7 mm. An information signal recording area extends outwardly from a radial position of 12.5 mm or less from the center of the medium.

In an embodiment, a disc cartridge according to the present invention comprise an optical disc including a substrate; a signal recording layer provided on the substrate and in which an information signal recorded on the signal recording layer is reproduced by detecting a change of the reflected light focused onto the signal recording layer, the optical disc having a diameter of 65 mm or less and a thickness of 0.4 to 0.7 mm, an information signal recording area defined thereon extending outwardly from a radial position of 12.5 mm or less from the center of the optical disc, a ratio of 3.4 or more between the information signal recording area and a non-signal recording area, and a storage capacity of at least 2 GB or more; and a rectangular cartridge in which the optical disc is encased. In the disc cartridge, a writing and/or reading access opening is formed in a side thereof to which an optical pickup to focus a light beam on at least the optical disc is opposite through which a radially extending portion of the optical disc is exposed, and a central opening is also formed through which a center hole formed at the center of the optical disc is exposed. The writing and/or reading access opening is formed deviated to one lateral side from the middle point of the front side of the cartridge.

In an embodiment, a disc cartridge according to the present invention encases an optical disc including a substrate and a signal recording layer provided on the substrate, and in which an information signal recorded on the signal recording layer is reproduced by detecting a change of the reflected light focused onto the signal recording layer. In an embodiment, a disc cartridge has a diameter of over 38 mm and under 52 mm and a thickness of 0.4 to 0.7 mm. An information signal recording area extends outwardly from a radial position of 12.5 mm or less from the center of the medium. Its storage capacity is at least 1 GB.

A disc cartridge according to the present invention encasing the above-mentioned read-only optical disc has a reading access opening formed only in a lower half.

These objects and other objects, features and advantages of the present intention will become more apparent from the following detailed description of the preferred embodiments of the present invention when taken in conjunction with the accompanying drawings.

DESCRIPTION OF THE DRAWINGS

FIG. 6 schematically illustrates reading of information signal recorded on the optical disc in FIG. 1.

FIG. 7 is a sectional view of a second optical disc according to the present invention.

DETAILED DESCRIPTION OF THE PRESENTLY PREFERRED EMBODIMENTS

Figure 1:
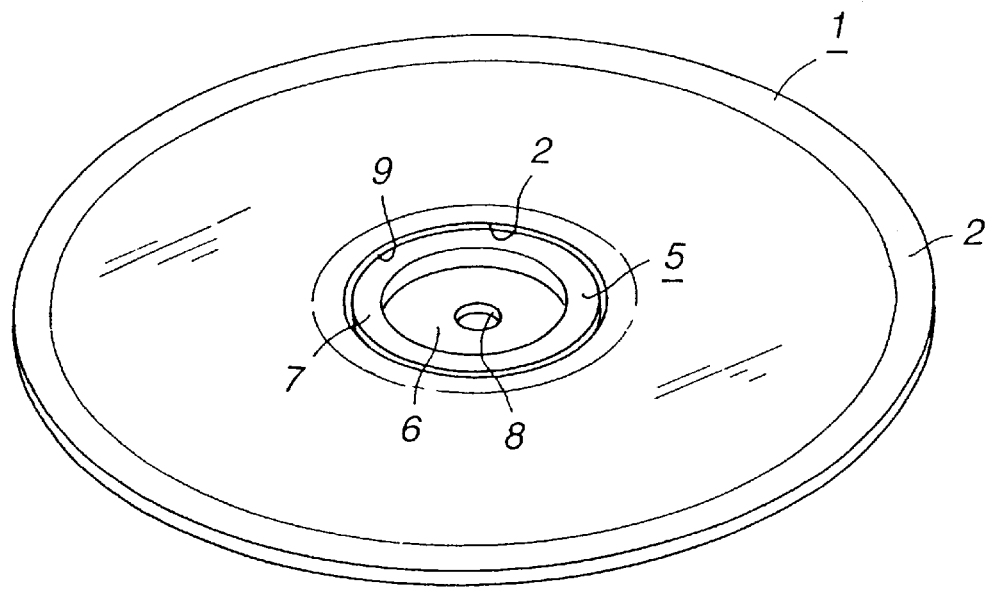
FIG. 1 is a perspective view of a first optical disc according to the present invention, showing the upper side thereof.
Figure 2:
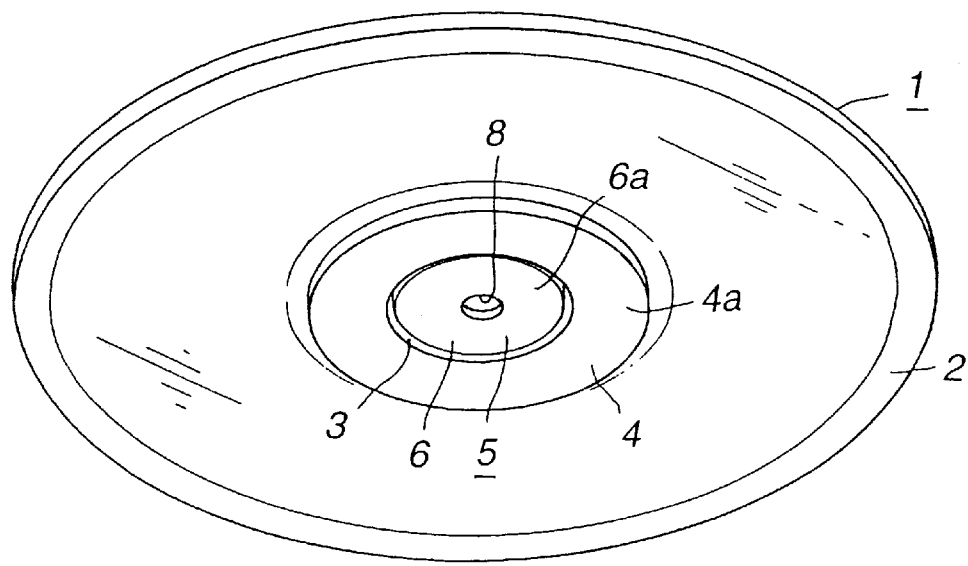
FIG. 2 is a perspective view of the optical disc in FIG. 1, showing the rear side thereof.
Figure 3:
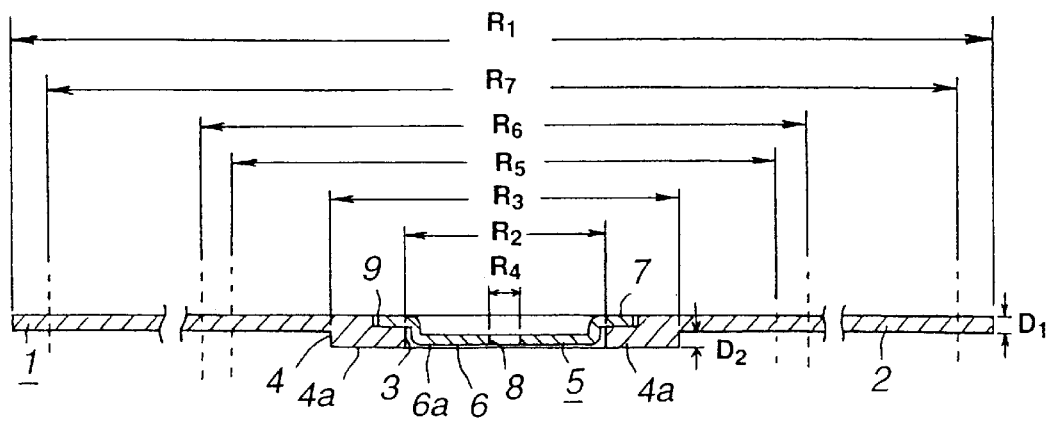
FIG. 3 is a sectional view of the optical disc in FIG. 1.

Referring to FIGS. 1, 2 and 3, there is schematically illustrated a first optical disc according to the present invention. The optical disc is generally indicated with a reference 1. As shown, the optical disc 1 includes a substrate 2 made of glass or a light-transparent synthetic resin such as polycarbonate resin to be 65 mm or less in diameter and 0.4 to 0.7 mm in thickness, and having a signal recording layer formed on one side thereof.

More specifically, the optical disc 1 consists of the substrate 2 made of polycarbonate resin to have a diameter $R_1$ of 64 mm and a thickness $D_1$ of 0.6 mm as shown in FIG. 3. The substrate 2 has formed therein at the center thereof a center hole 3 having a diameter $R_2$ of 8 mm. The substrate 2 has formed around the center hole 3 an annular table-abutment 4 being convex to one side of the substrate 2. The table-abutment 4 is to be placed on a disc table of a rotation driving mechanism in an optical recording and/or reproducing apparatus in which the optical disc 1 is set. The table-abutment 4 has an outside diameter $R_3$ of 14 mm, and is convex approximately $D_2$ equal to the thickness $D_1$ of the substrate 2 from one side of the latter.

There is provided at the center of the substrate 2 a magnetic clamping hub 5 to close the center hole 3. The hub 5 is formed from a thin plate of a magnetic metal such as iron. As shown in FIG. 3, the hub 5 consists of a depressed portion 6 formed at the center thereof for fitting into the center hole 3, and a flange portion 7 formed around the depressed portion 6 for fixing to the substrate 2. The depressed portion 6 thus has the form of a bottomed cylinder. The depressed portion 6 has formed therein at the center thereof a spindle hole 8 in which a spindle of the rotation driving mechanism engages. The spindle hole 8 has a diameter $R_4$ of 2.0 mm. The table-abutment 4 is concaved as indicated with a reference 9 in its convexing direction.

As shown in FIG. 3, the hub 5 is secured to the substrate 2 with the depressed portion 6 thereof fitted in the center hole 3 of the substrate 2 and the flange portion 7 engaged in the concavity 9 of the substrate 2. The hub 5 is fixed at the flange portion 7 thereof in the concavity 9 with an adhesive. Also as seen from FIG. 3, the hub 5 is fixed to the substrate 2 so that a lower surface 6a of the depressed portion 6 positioned at the side of the table-abutment 4 will not protrude from a lower surface 4a of the table-abutment 4. That is, the height of the hub 5 from the lower surface 6a of the depressed portion 6 to the flange portion 7 is designed smaller than the thickness of the table-abutment 4 of the substrate 2.

Figure 4:
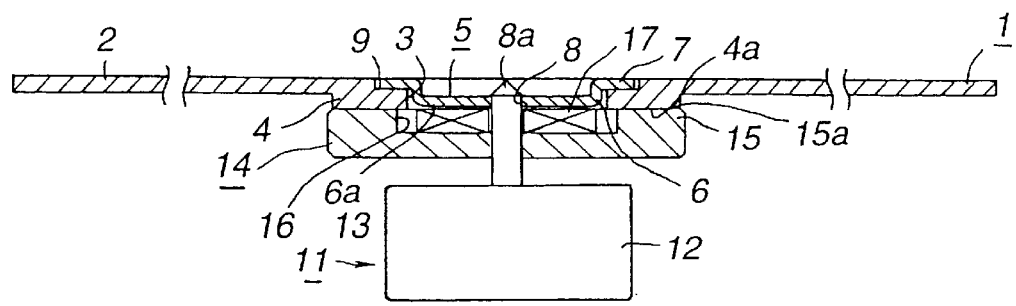
FIG. 4 is a sectional view of the optical disc in FIG. 1, set on the rotation driving mechanism of a disc recording and/or reproducing apparatus.

As described above, the optical disc 1 includes the substrate 2 provided with the table-abutment 4 and hub 5 is set on a rotation driving mechanism 11 of an optical recording and/or reproducing apparatus as shown in FIG. 4. The rotation driving mechanism 11 consists of a spindle motor 12, a spindle 13 driven by the motor 12, and a disc table 14 fixed at an end of the spindle 13 rotatably with the spindle 13. The disc table 14 has a disc-abutment 15 formed along an outer circumference thereof and a concavity 16 formed inside the disc-abutment 15 and in which an annular magnet 17 is fixed. The magnet 17 is secured to be flush with an upper surface 15a of the disc-abutment 15 or not to protrude from the disc-abutment surface 15a. The optical disc 1 is set on the disc table 14 by placing the table-abutment 4 on the disc-abutment 15 with the spindle 13 fitted into the spindle hole 8 of the hub 5. The hub 5 of the optical disc 1 is attracted by the magnet 17 and is thus securely held on the disc table 14. Thus the optical disc 1 can be rotated along with the disc table 14.

The spindle 13 is formed to have generally a same diameter as the spindle hole 8 so that the center of rotation of the optical disc 1 can coincide with the axis of the spindle shaft 13 for correct setting of the optical disc 1 on the disc table 14.

As aforementioned with reference to FIG. 3, the hub 5 is fixed to the substrate 2 so that a lower surface 6a of the depressed portion 6 positioned at the side of the table-abutment 4 will not protrude from the lower surface 4a of the table-abutment 4. Therefore, when the optical disc 1 is set on the disc table 14, it will be in the vicinity of, but not in contact with, the magnet 17. Since the hub 5 is placed in the vicinity of the magnet 17, the optical disc 1 is attracted toward the disc table 14 by a large magnetic attractive force and thus can be rotated along with the disc table 14. When the optical disc 1 is set on the disc table 14, the hub 5 will not be in contact with the magnet 17, so that no excessive attractive force will act on the hub 5 and hence the optical disc 1 can easily be set onto or removed from the disc table 14.

Since the hub 5 is secured to the substrate 2, for the depressed portion 6 thereof to be positioned at the side of the table-abutment 4, the spindle 13 can be engaged in the spindle hole 8 of the hub 5 to a sufficient amount even if its protrusion from the disc table 14 is small. For example, if the spindle 13 is provided with a taper centering end portion 8a as shown in FIG. 4, it can be formed to such a height that it will not protrude from the optical disc 1 and can center the latter. By forming the spindle 13 to a limited length or height, the rotation driving mechanism 11 can be designed to have a limited height and hence a recording and/or reproducing apparatus using the low rotation driving mechanism 11 can be designed thinner.

The magnet used in the conventional magnetically clamping rotation driving mechanism has a strength BHmax of about 30 MG oersteds. In this embodiment, the optical disc 1 includes the substrate 2 made of polycarbonate resin to have the diameter $R_1$ of 64 mm and thickness $D_1$ of 0.6 mm. To keep the optical disc 1 magnetically clamped to the disc table 14 from easily being separated from the disc table 14 even when the latter is applied with a shock, a magnetic attractive force of 120 g or so is required. With such an attraction, the optical disc 1 can be rotated together with the disc table 14 even at a rotating speed of 4,000 rpm or more.

To obtain such a magnetic attractive force using the magnet used in the conventional rotation driving mechanism, the hub 5 should have a surface of 8 mm or so in diameter to be attracted by the magnet. Also, to hold the optical disc 1 having the diameter $R_1$ of 64 mm horizontally on the disc table 14, the annular table-abutment surface 4a around the hub 5 should be 2.6 mm or so wide. However, it is difficult for the reason of molding technique to form the table-abutment 4 convex to one side of the substrate 2 and having a high flatness over its whole lower surface 4a to every corners. More specifically, a range of 0.2 mm or so on either end of the table-abutment 4 cannot be counted as the table-abutment surface 4a. Taking these factors in consideration, the table-abutment 4 should be formed to a diameter of at least 14 mm or so in case the hub 5 of 8 mm or so in diameter, which is to be attracted by the magnet 17, is disposed at the center of the table-abutment 4 and inside the lower or table-abutment surface 4a of 2.6 mm or so in diameter.

Figure 5:
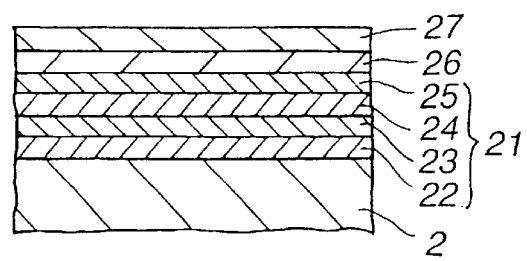
FIG. 5 is a sectional view of the optical disc in FIG. 1, showing the signal recording layer.

As having been described above, the optical disc 1 has formed at the center thereof the table-abutment 4 convex to one side of the substrate 2 and in which the hub 5 is to be fixed. Further the optical disc 1 has a signal recording layer 21 formed on the other side of the substrate 2 as shown in FIG. 5, for example. The signal recording layer 21 consists of a recording layer 22, auxiliary recording layer 23, non-magnetic layer 24 and perpendicular magnetic layer 25 stacked in this order on the substrate 2.

The recording layer 22 is formed from a film of a material, such as GdFeCo alloy, having a magnetic axis parallel to the layer surface at room temperature and which will be magnetized in a direction perpendicular to the layer surface at a temperature approximate to a reading temperature attained when heated with a light beam focused thereon for reading an information signal recorded on the optical disc 1. The auxiliary recording layer 23 is provided to improve the reading resolution and thus the reading characteristic and is formed from a film of a material, such as GdFe alloy, having a Curie temperature approximate to the reading temperature attained when heated with the reading light beam, having a magnetic axis parallel to the layer surface before it is heated up to the Curie temperature, and losing the magnetic axis parallel to the layer surface after it is heated up to a higher temperature than the Curie temperature. More particularly, at a lower temperature than the Curie temperature, the recording layer 22 has a switched connection with the auxiliary recording layer 23 and thus has an intra-plane magnetized status in which the direction of magnetization is parallel to the layer surface. On the other hand, at a temperature higher than the Curie temperature, the auxiliary recording layer 23 loses the direction of magnetization and thus the recording layer 22 has a magnetostatic connection with the perpendicular magnetic layer 25 and is perpendicularly magnetized in the magnetized direction of the recording magnetic layer 25.

The non-magnetic layer 24 is provided to reduce the influence of the recording layer 22 on the recording magnetic layer 25 when an information signal is written to the recording magnetic layer 25. It is formed from an AlN or SiN film, for example.

The recording magnetic layer 25 is an amorphous ferromagnetic layer of which the magnetic easy axis is perpendicular to the layer surface. It is formed from a film of an amorphous ferromagnetic material having a large coercive force at room temperature and a Curie point approximate to 200° C., such as a TbFeCo alloy or a TbFeCo alloy to which an element of the fourth group such as Cr is added in a very small amount.

The signal recording layer 21 constructed as described above has a reflective metal layer 26 formed thereon. The reflective metal layer 26 is made of a high reflectivity, nonmagnetic metal to reflect 70% or more of the light beam incident upon the optical disc 1. This material should preferably be a good thermal conductor such as Al, Au, Ag or the like. The reflective metal layer 26 is protected by a protective layer 27 of a photo-curing resin or the like formed on the reflective metal layer 26.

To write an information signal to the signal recording layer 21 of the optical disc 1 constructed as above-mentioned, pulse-irradiated magnetic modulation is used in which a light beam is pulsed for each recording data clock to modulate the recording magnetic field according to the recording data. This technology enables a higher density of recording than the conventionally used light intensity modulation. More specifically, with the pulse-irradiated magnetic modulation, pits having a same shape as a beam spot focused by an objective lens on the signal recording layer 21 are written to overlap one on the other on the recording magnetic layer 25, whereby an information signal can be recorded beyond an optical limit depending upon a light spot distribution ($\lambda$/NA) determined from a relation between a wavelength $\lambda$ of a light beam generated in the light intensity modulation and a numerical aperture NA of the objective lens by which the light beam is focused onto the signal recording layer.

To write an information signal using pulse-irradiated magnetic modulation, a light beam of 380 to 420 nm or 630 to 670 nm in wavelength $\lambda$ is used. An objective lens having a numerical aperture NA of 0.5 to 0.7 is used to focus the light beam onto the signal recording layer. Recording tracks with a pitch of 0.3 to 0.55 $\mu$m are formed to write the information signal along them and with a pit length of 0.1 to 0.22 $\mu$m/bit.

When the numerical aperture NA of the objective lens is 0.6 and the working distance between the objective lens and optical disc 1 is 1.1 mm, a light beam emitted from a semiconductive laser and formed to be a parallel light incident upon the objective lens has a diameter of 3 mm. In this case, the objective lens upon which the parallel light of 3 mm in diameter is incident should have a diameter of 4 mm. Thus, a lens bobbin supporting the objective lens has to be 5 mm or more in diameter. To control the focusing and tracking of the laser beam outgoing from the objective lens supported by the lens bobbin and which scans the signal recording area of the optical disc 1, the lens bobbin is installed on a biaxial actuator which drives to move the objective lens in a focusing direction parallel to the optical axis of the objective lens and in a tracking direction perpendicular to the optical axis. Therefore, a space of about 1.5 mm for part installation has to be provided outside the lens bobbin.

The optical disc 1 has the table-attachment 4 of 14 mm or so in diameter provided at the center thereof. The recording and/or reproducing apparatus has disposed therein the disc table 14 having generally the same size as the table-attachment 4 and on which the table-attachment 4 is to be mounted. When the optical disc 1 constructed as mentioned above is scanned with a light beam emitted from an optical pickup unit using the objective lens of 4 mm in diameter, the center of the light beam can be moved to a radial position of 11 mm near the lead-in area of the optical disc 1. That is, the light beam cannot be irradiated to an inner area having a diameter $R_5$ of 22 mm. Therefore, the optical disc 1 has an information signal recording area defined outside the inner area having the diameter $R_5$ of 22 mm.

To assure accurate optical read, by a light beam, of an information signal recorded as magneto-optical signal in the information signal recording area, a birefringence by the substrate 2 has to be 30 nm or less for reciprocation of the light beam. Therefore, the information signal recording area is defined outside the inner area having the diameter $R_5$ of 22 mm and in which the birefringence of light beam indicated upon the substrate 2 is assured to be less than 30 nm for reciprocation.

As shown in FIG. 3, the optical disc 1 has a signal recording area extending outwardly from a radial position of 12.5 mm or less from the center of the optical disc 1, namely, from a diametrical position $R_6$ of 25 mm or less, to positively write a maximum amount of an information signal to the optical disc 1 and also to positively read a recorded information signal from the optical disc 1.

More specifically, the optical disc 1 has defined thereon an audio and video information signal recording area of which the inside diameter $R_6$ is 24.5 mm and the outside diameter $R_7$ is 61 mm. Further, on the optical disc 1 are formed, inside the signal recording area, an area in which control signals, etc., which are used for information signal write to and read from the optical disc 1, are recorded, and, outside the signal recording area an area in which control signals, etc., which are indicative of the end of the signal recording area, are recorded.

In the optical disc 1 constructed as in the above, the ratio between the information signal recording area and non-information signal recording areas is 3.4 or more.

If pulse-irradiated magnetic modulation is adopted with the optical disc 1 according to the present invention, use of a light beam of 400 nm in wavelength $\lambda$ permits to recording of record 4 gigabytes or more of an information signal, while use of a light beam of 660 nm in wavelength $\lambda$ permits to recording of 2 gigabytes or more of an information signal.

Since it is possible to record 2 gigabytes or more of an information signal on the optical disc 1, conventionally proposed signal compression technology can be used to record many pictures. For example, the JPEG standard can be used to record 200 or more still pictures, and the audio coding technique included in the MPEG2 standard can be used to record an MPEG2 moving picture (transfer rate of 8 Mbps) for more than 30 min along with sound.

To read an information signal recorded on the optical disc 1 using pulse-irradiated magnetic modulation as described above, a light beam $L_1$ is irradiated to the optical disc 1 through the substrate 2 as shown in FIG. 6. When the light beam $L_1$ is irradiated to the optical disc 1, a portion of a recording layer 22 formed from a GdFeCo alloy film on which the light beam $L_1$ is focused is heated to a higher temperature than predetermined. A portion of the auxiliary recording layer 23 formed from the GdFe alloy film on which the light beam $L_1$ is focused is heated to a higher temperature than the Curie temperature and loses the direction of magnetization. As a result, the heated portion of the recording layer 22 has a magnetostatic connection with the recording magnetic layer 25 and is perpendicularly magnetized in the magnetized direction of the recording magnetic layer 25 as shown in FIG. 6A. The surrounding of the perpendicularly magnetized portion of the recording magnetic layer 25 keeps an intra-plane magnetized status in which the magnetic axis is parallel to the layer surface to function as a mask 29 in which no Kerr effect will take place while the perpendicularly magnetized portion functions as an aperture 30 for the light beam $L_1$ incident upon the recording magnetic layer 25, as shown in FIG. 6B. Thus, since only the portion of the recording layer 22 on which the light beam $L_1$ is focused is perpendicularly magnetized along the magnetized direction of the recording magnetic layer 25, it is possible to read, with high resolution, an information signal recorded in the form of microscopic pits 32 on recording tracks 31 formed with a small pitch on the optical disc 1.

In this embodiment, the first optical disc 1 has the diameter $R_1$ of 64 mm and the thickness $D_1$, of 0.6 mm. However, the present invention is not limited to these dimensions, but the diameter $R_1$ may be increased up to 65 mm. The diameter $R_1$ may be 65 mm or less so long as an intended storage capacity can be attained. Also, the thickness $D_1$ of the optical disc 1 may appropriately be selected from a range of 0.4 to 0.7 mm depending upon the wavelength of a light beam used to write and/or read the information signal.

In addition to the first optical disc 1 as described in the foregoing, the present invention provides also another embodiment of an optical disc.

Referring now to FIG. 7, there is schematically illustrated a second optical disc according to the present invention. The optical disc is generally indicated with a reference 41. This optical disc 41 can be used in an optical recording and/or reproducing apparatus in which the aforementioned optical disc 1 can also be used. The optical disc 41 has the same construction as the optical disc 1 except for its outside diameter. Therefore, the same or similar elements as or to those of the optical disc 1 are indicated with the same or similar references and will not further be described.

The optical disc 41 is formed to have a diameter of more than 38 mm to less than 52 mm and a thickness of 0.4 mm to 0.7 mm. More specifically, the optical disc 41 has a diameter $R_{11}$ of 50 mm as shown in FIG. 7. The optical disc 41 comprises a substrate 42 formed from glass or a light transparent polycarbonate resin having a signal recording layer formed on one side thereof.

The substrate 42 of the optical disc 41 is formed from a polycarbonate resin to have the diameter $R_{11}$ of 50 mm and a thickness $D_{11}$ of 0.6 mm as shown in FIG. 7. The substrate 42 has formed at the center thereof a center hole 3 having a diameter $R_2$ of 8 mm as in the optical disc 1. The substrate 42 has formed around the center hole 3 an annular table-abutment 4 being convex to one side of the substrate 42. There is provided at the center of the substrate 42 a magnetic clamping hub 5 to close the center hole 3 as in the optical disc 1. As shown, the hub 5 consists of a depressed portion 6 formed at the center thereof. The depressed portion 6 has formed therein at the center thereof a spindle hole 8 in which engages a spindle of a rotation driving mechanism. The spindle hole 8 has a diameter $R_4$ of 2.0 mm. As in the optical disc 1, the hub 5 is fitted at the depressed portion 6 thereof in the center hole 3 of the substrate 2, and the table-abutment 4 is concaved as indicated with a reference 9 in its convexing direction. The hub 5 has a flange 7 formed around the depressed portion 6 thereof and which is to be engaged in the concavity 9 of the substrate 42.

The substrate 42 has provided on the other side thereof, opposite to that where the table-abutment 4 is formed, a signal recording layer 21, which is similar to that in the optical disc 1.

To write an audio and video information signal to the signal recording layer 21 of the optical disc 41, constructed as above-mentioned, pulse-irradiated magnetic modulation, in which a light beam is pulsed for each recording data clock to modulate the recording magnetic field according to the recording data, is adopted as with the optical disc 1.

As in the optical disc 1, the optical disc 41 has the table-attachment 4 provided at the center thereof as mentioned above. The recording and/or reproducing apparatus, which is compatible with both the optical discs 1 and 41, has disposed therein a disc table 14 having the generally same size as the table-attachment 4 and on which the table-attachment 4 is to be mounted. Thus, the optical pickup unit compatible with the optical disc 1 will be used with the optical disc 42. Therefore, similarly to the optical disc 1, the optical disc 41 will have formed thereon an information signal recording area extending outwardly from an inside diameter $R_5$ of at least 22 mm. Namely, the optical disc 41 has a signal recording area extending outwardly from a radial position of 12.5 mm or less from the center of the optical disc 41, namely, from a diametrical position $R_6$ of 25 mm or less, as shown in FIG. 7, to positively write a maximum amount of information signal.

More specifically, the optical disc 41 has defined thereon an audio and video information signal recording area of which the inside diameter $R_6$ is 24.5 mm and the outside diameter $R_{17}$ is 46.5 mm. Further, on the optical disc 41 are formed, inside the signal recording area, an area in which control signals, etc., which are used for information signal write to and read from the optical disc 1, are recorded; and, outside the signal recording area, an area in which control signals, etc., which are indicative of the end of the signal recording area, are recorded.

If pulse-irradiated magnetic modulation is adopted with the optical disc 41 according to the present invention, use of a light beam of 400 nm in wavelength λ permits recording of 2 gigabytes or more of an information signal, while use of a light beam of 660 nm in wavelength λ permits recording of 1 gigabytes or more of an information signal.

To read an information signal recorded on the optical disc 41 using the pulse-irradiated magnetic modulation as described in the above, the same method as that for reading an information signal recorded on the optical disc 1 is adopted.

In the second embodiment, the second optical disc 41 has the diameter $R_{11}$ of 50 mm and the thickness $D_{11}$ of 0.6 mm. To assure an intended storage capacity of the optical disc 41, however, the diameter $R_{11}$ may appropriately be selected from a range of 38 to 52 mm while the thickness $D_{11}$ may appropriately be selected from a range of 0.4 to 0.7 mm depending upon the wavelength of a light beam used for write and/or read of an information signal.

In the foregoing, the first and second optical discs 1 and 41 according to the present invention have been described. Each of the optical discs 1 and 41 has only a single signal recording layer on each of the substrates 2 and 42. However, in case the optical discs 1 and 41 are read-only optical discs, two or more signal recording layers may be formed on each of the substrates 2 and 42.

Figure 8:
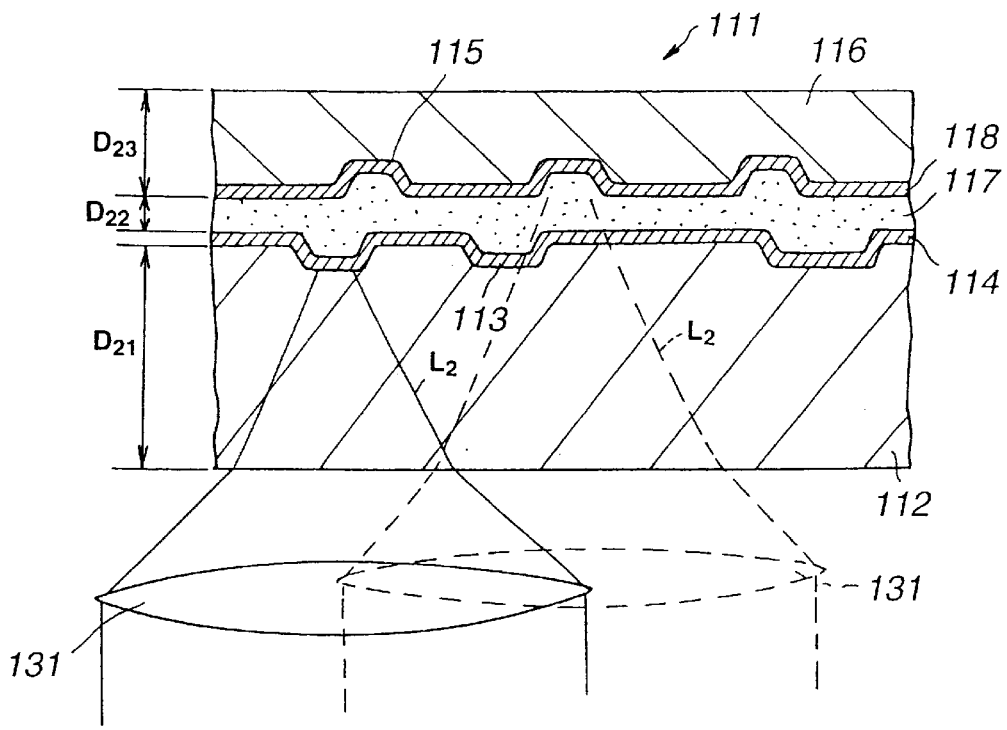
FIG. 8 is a sectional view, enlarged in scale, of a third optical disc according to the present invention, this optical disc being of a read-only type.

Referring now to FIG. 8, there is schematically displayed a third optical disc, which is a read-only optical disc having two signal recording layers. The optical disc is generally indicated with a reference 111. The optical disc 111 is formed to have the same size as the first optical disc 1. Its diameter is 65 mm or less and its thickness ranges from 0.4 to 0.7 mm.

Similar to the optical disc 1, the optical disc 111 may have a diameter of up to 65 mm. It may have a diameter of 65 mm or less depending upon an intended storage capacity. Also the optical disc 111 is formed to have a thickness appropriately selected from a range of 0.4 to 0.7 mm according to the wavelength of a light beam used to read an information signal recorded on the optical disc 111.

As shown in FIG. 8, the third optical disc 111 comprises a substrate 112 formed from a light-transparent synthetic resin such as polycarbonate. The substrate 112 is formed to have a diameter of 65 mm or less and a thickness $D_{21}$ ranging from 0.4 to 0.7 mm. It has preformed on one side thereof a pit pattern 113 that is a pattern of very small convexities and concavities. That is to say, the substrate 112 is formed by injecting a molten polycarbonate into a mold in which there is disposed a stamper having formed thereon a pattern of convexities and concavities corresponding to the concavities and convexities, respectively, on the pit pattern 113. As shown in FIG. 8, the substrate 112 has a first signal recording layer 114 formed along the pit pattern 113 on one side thereof where the pit pattern 113 is formed. The first signal recording layer 114 is formed from a translucent silicon film such as $Si_3N_4$, $SiO_2$ or the like which allows to pass a predetermined amount of a light beam irradiated through the substrate 112 while reflecting a predetermined amount of the light beam. The first signal recording layer 114 consists of more than one silicone film of $Si_3N_4$, $SiO_2$ or the like stacked one on the other to a thickness $D_{22}$ of 100 to 500 nm. The silicon films of $Si_3N_4$, $SiO_2$ or the like are produced by vacuum deposition or sputtering.

In this read-only optical disc 111, the pit pattern 113 formed on the substrate 112 is formed with a track pitch about 1.4 times larger than that of the recording tracks formed on the optical discs 1 and 41. Also, the minimum length of the pits included in the pit pattern 113 is about 1.4 times larger than those in the optical discs 1 and 41. That is, in the read-only optical disc 111, the track pitch of the recording tracks is 0.4 to 0.77 μm and pit length is 0.14 to 0.31 μm/bit. Therefore, the recording tracks can be formed by injection molding of a synthetic resin.

When formed to sizes for the discs 1 and 41, respectively, the stamper prepared with the above-mentioned track pitch and shortest pit length will provide a pit pattern being a half of that recorded on the optical discs 1 and 41. The pit pattern will result in a storage capacity of the substrate 112 that is also a half of that of the discs 1 and 41. Therefore, when the stamper in consideration is used to form the optical disc 111 in a size corresponding to that of the discs 1 and 41, the amount of information recordable on this optical disc 111 will be a half of that recordable on the optical discs 1 and 41.

In the optical disc 111, the substrate 112 has a center hole 3 formed at the center thereof, as in the optical discs 1 and 41. The substrate 112 has formed around the center hole 3 and on a side thereof, opposite to the side on which the signal recording layer 114 is formed, an annular disc-abutment 4 convexing away from the signal recording layer 114. Further, a magnetic-clamping hub 5 is provided at the center of the substrate 112 to close the center hole 3, as in the optical discs 1 and 41.

To the first signal recording layer 114 on the substrate 112 of the optical disc 111, there is joined a sheet 116 formed sufficiently thinner than the substrate 112 and having preformed on one side thereof a pit pattern 115 being a pattern of very small concavities and convexities corresponding to information signals. There is provided between the first signal recording layer 114 and sheet 116 a light-transparent layer 117 made of a light-transparent ultraviolet-curable synthetic resin.

The sheet 116 is formed from a light-transparent synthetic resin such as polycarbonate to a thickness $D_{23}$ of 0.05 to 0.1 mm. The pit pattern 115 formed on one side of the sheet 116 is formed by thermally stamping a pattern formed on a stamper and consisting of convexities and concavities corresponding to the concavities and convexities, respectively, of the pit pattern 115. As shown in FIG. 8, a second signal recording layer 118 is formed along the pit pattern 115. To reflect with a high efficiency towards an optical pickup unit disposed in front of the substrate 112, a light beam focused thereon through the first signal recording layer 114 and light-transparent layer 117, the second signal recording layer 118 is formed from a film of a highly reflective metal such as aluminum (Al), gold (Au) or silver (Ag).

Figure 9:
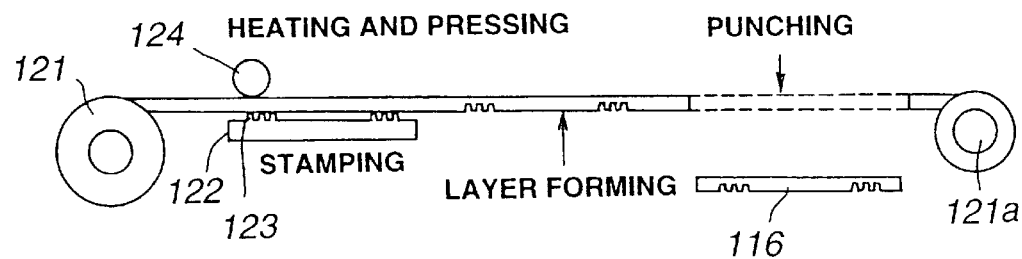
FIG. 9 schematically illustrates the process of manufacturing a sheet from which the read-only optical disc is produced.

The sheet 116 having the pit pattern 115 and second signal recording layer 118 formed thereon is produced through a process as shown in FIG. 9. To form the sheet 116, a polycarbonate web 121 is fed to a replicating or stamping post where a stamper 122 and pressing roller 124 are provided. The stamper 122 has formed thereon a pattern 123 of concavities and convexities corresponding to the convexities and concavities, respectively, of the intended pit pattern 115. The pressure roller 124 is provided with a heating means. The polycarbonate web 121 is passed between the stamper 122 and pressure roller 124 while being heated and pressed. Thus, the polycarbonate web 121 has the pit pattern 123 stamped thereon, and is further fed towards a take-up roll 121a. Before the polycarbonate web is taken up on the roll 121a, it is moved into a sputtering post where the second signal recording layer 118 is formed on a portion of the web 121 on which the pit pattern 123 has been stamped. Further, the polycarbonate web 122 is moved to a punching post where the web portion, on which the second signal recording layer 118 is formed, is punched to a size for attachment to the substrate 112, thereby forming the sheet 116. The web 122 is wound on a take-up roll 121a.

The pit pattern 123 formed on the stamper 122 is formed on recording tracks whose pitch is about 1.4 times larger than that of the recording tracks formed on the optical discs 1 and 41. The minimum length of the pits forming the pit pattern 115 is also about 1.4 times larger than that in the optical discs 1 and 41. When the stamper 122 for such tack pitch and minimum pit length is formed to sizes corresponding to those of the optical discs 1 and 41, respectively, it will have a pit pattern being a half of those of the pit patterns formed on the optical discs 1 and 41, and whose storage capacity is also a half of those of the optical discs 1 and 41. When the sheet 116 formed by the stamper 122 is formed to sizes corresponding to those of the optical discs 1 and 41, respectively, the amount of information recorded on the sheet 116 will be a half of those of the optical discs 1 and 41.

The sheet 116 thus formed is joined to the substrate 112 with the second and first signal recording layers 118 and 114 placed face-to-face. As mentioned above, an ultraviolet-curable resin is used as the light-transparent layer 117 between the sheet 116 and substrate 112.

Figure 10:
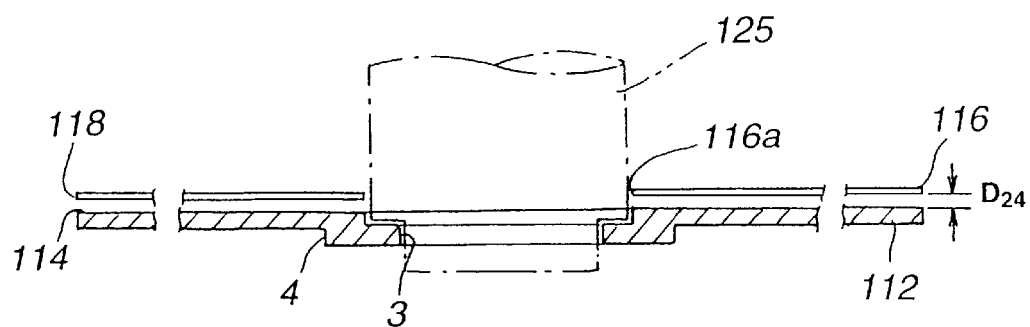
FIG. 10 is a sectional view of the read-only optical disc, showing how the substrate and sheet thereof are joined together.

To join the sheet 116 to the substrate 112, they are centered with each other and the first and second signal recording layers 114 and 118 are placed in a face-to-face relation with a space $D_{24}$ of 20 to 35 μm between them. To this end, a jig 125, for example, is inserted into a center hole 116a formed at the center of the sheet 116 and center hole 3 in the substrate 112 as shown in FIG. 10 to center the sheet 116 and substrate 112 with each other and to provide the space of 20 to 35 μm between the first and second signal recording layers 114 and 118. Then an ultraviolet-curable resin, for example, is injected between the substrate 112 and sheet 116 to form the light-transparent layer 117. With the substrate 112 and sheet 116 rotated, the ultraviolet-curable resin injected between the substrate 112 and sheet 116 is spread to a uniform thickness. Thereafter, ultraviolet rays are irradiated through the substrate 112 to harden the ultraviolet-curable resin to join the substrate 112 and sheet 116 to each other.

Next, the hub 5 is installed to the substrate 112 to cover the center hole 3 in the substrate 112 to finish the optical disc 111.

As mentioned above, the substrate 112 and sheet 116 are joined to each other with the space of 20 to 35 μm between them and the ultraviolet-curable resin, for example, injected into the space to form the light-transparent layer 117 which will thus have a thickness $D_{24}$ of 20 to 35 μm.

When a light beam of 380 to 420 nm in wavelength λ, or a light beam of 630 to 670 nm in wavelength λ, is focused on the first or second signal recording layer 114 or 118 through an objective lens having a numerical aperture (NA) of 0.5 to 0.7, the focal depth will be ±1 μm. Since the light-transparent layer 117 has the thickness $D_{24}$ of 20 to 35 μm, an information signal recorded on the first or second signal recording layer 114 or 118 can accurately be read by a common light beam $L_2$ and objective lens 131 independently without mutually affecting each other and without being influenced by a spherical aberration of the objective lens 131.

To read an information signal from the first or second recording layer 114 or 118, the position of the objective lens 131 is controlled for the light beam $L_2$ to be focused on the first or second signal recording layer 114 or 118 as shown in FIG. 8. The position of the objective lens 131 is controlled using, for example, control signals indicative of the first and/or second signal recording layers 114 and/or 118 and recorded in control signal recording areas for the first and/or second signal recording layers 114 and/or 118.

In the aforementioned third optical disc 111 according to the third embodiment, an information signal can be recorded on each of the first and second signal recording layers 114 and 115 in an amount being a half of that recordable in the optical disc 1. Therefore, the optical disc 111 has a total storage capacity equivalent to that of the optical disc 1.

As in the above, the read-only optical disc 111 is constructed so that an information signal is read from the first and second signal recording layers 114 and 118 by irradiating light beams through the substrate 112 to the respective signal recording layers 114 and 118. However, by forming the second signal recording layer 118 from a translucent material which will allow to pass a predetermined amount of a light beam while reflecting a predetermined amount of the light beam, it is also possible to read information signal from the first and second signal recording layers 114 and 118 by irradiating a light beam through the sheet 116.

Figure 11:
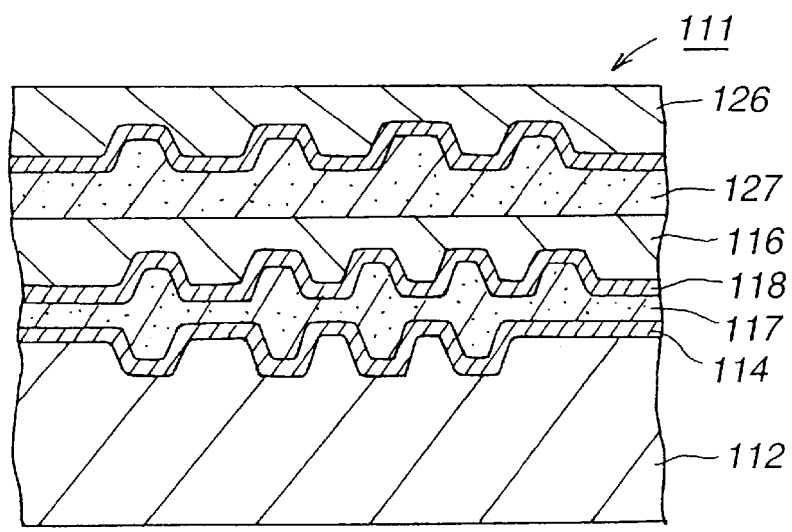
FIG. 11 is a sectional view of An embodiment of the read-only optical disc according to the present invention.

Further, in the read-only optical disc 111, a second sheet 126 may be joined to the sheet 116 (namely, the first sheet) with a second light-transparent layer 127 made of a light-transparent, ultraviolet-curable material or the like laid between them as shown in FIG. 11. Namely, three signal recording layers may be formed in the optical disc 111. In this case, the signal recording layer 118 formed on at least the first sheet 116 is formed as a translucent layer which will allow to pass a predetermined amount of a light beam while reflecting a predetermined amount of the light beam.

The above-mentioned read-only multi-layered optical disc may be formed to the size of the second optical disc according to the present invention, that is, the optical disc 41. Also in this case, since each of the signal recording layers is able to record a half of the information amount recordable on the optical disc 41, the two signal recording layers can record a total amount of information equivalent to that recordable in the first optical disc according to the present invention, namely, the optical disc 1.

The optical discs 1 and 41 constructed as having been described in the foregoing record an information signal with an extremely high density. Therefore, any little dust or small scratch on the optical discs will make it impossible to accurately write or read an information signal.

Thus, to avoid the above inconvenience, each of the optical discs 1 and 41 according to the present invention is encased in a cartridge. As a disc cartridge, it is set as encased in a cartridge in a recording and/or reproducing apparatus or it is stored as encased in the cartridge.

Referring now to FIGS. 12 to 19, there are illustrated disc cartridges according to the present invention.

Figure 12:
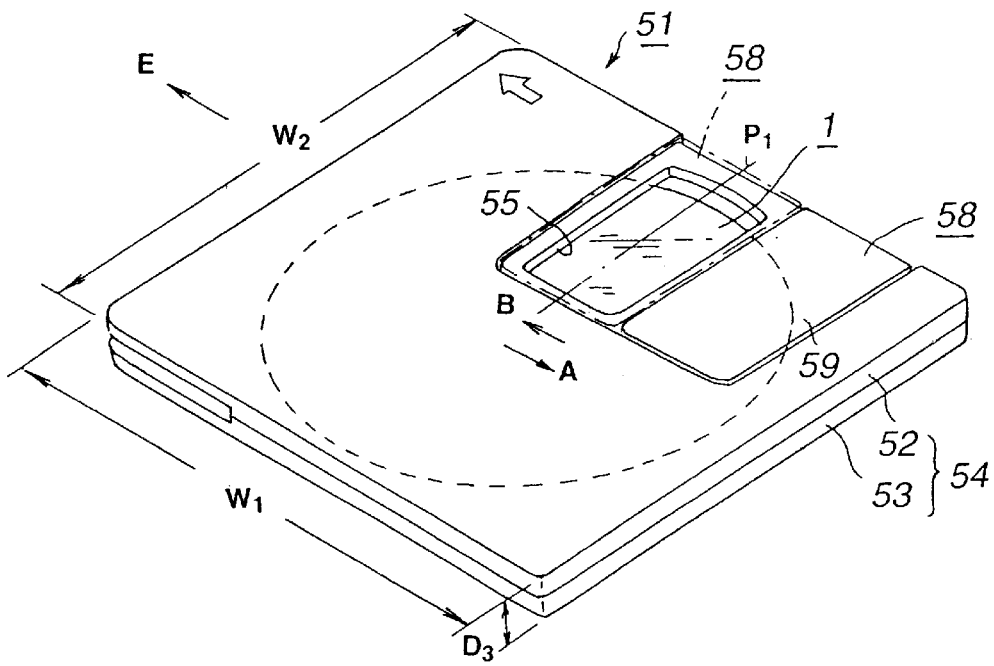
FIG. 12 is a perspective view of a first disc cartridge in which the first optical disc is encased.
Figure 13:
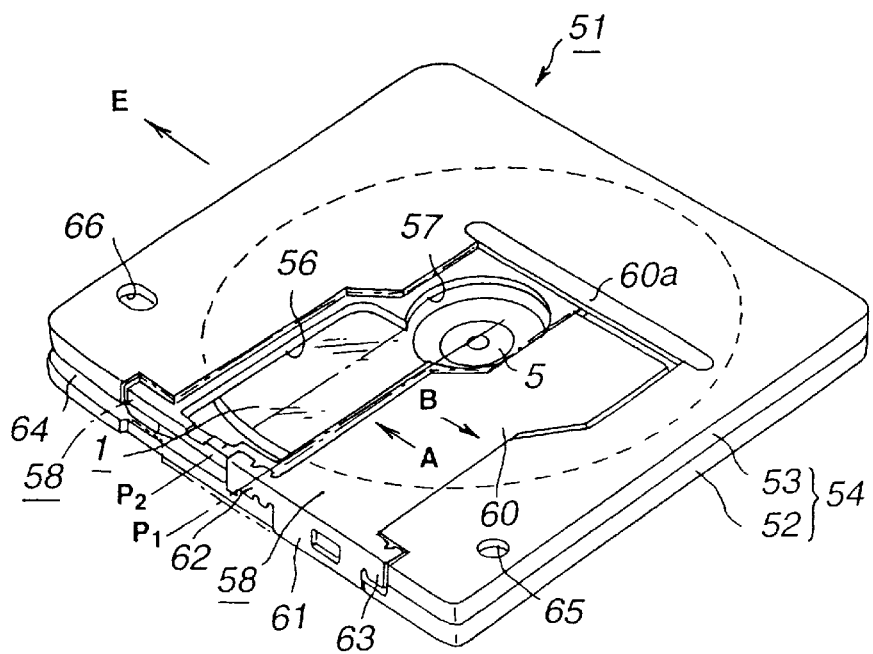
FIG. 13 is a perspective view of the first disc cartridge, showing the rear side thereof.

The disc cartridge is generally indicated with a reference 51 as shown in FIGS. 12 and 13. The disc cartridge 51 encases the optical disc 1 having been described in the foregoing. It consists of upper and lower halves 52 and 53 butted to each other to form a cartridge 54 in which the optical disc 1 is encased. The cartridge 54 is formed to have a rectangular shape of which a first side has a length $W_1$ of 52 to 70 mm and a second side has a length $W_2$ of 52 to 75 mm, perpendicular to the first side. Therefore, the optical disc 1 of 65 mm or less in diameter can be encased rotatably in the cartridge 54. The lengths $W_1$ and $W_2$ of the first and second sides of the cartridge 54 are appropriately selected from ranges of 52 to 70 mm and 52 to 75 mm, respectively, according to the size of the optical disc 1 to be encased in the cartridge 54. The cartridge 54 has a thickness $D_3$ selected from a range of 3 to 6 mm according to the thickness of the optical disc 1 to be encased therein.

That is, the cartridge 54 is formed according to the size of the optical disc 1 to have a rectangular shape having a necessary minimum length, width and thickness to encase the optical disc 1.

In effect, the disc cartridge 51 shown in FIGS. 12 and 13 comprises the cartridge 54 with the first side having the length $W_1$ of 68 mm, second side having the length $W_2$ of 72 mm and thickness $D_3$ of 5 mm since the optical disc 1 to be encased therein has a diameter $R_1$ of 64 mm and thickness $D_1$ of 0.6 mm.

The cartridge 54 has formed in the upper half 52 thereof a writing access opening 55 through which a radially extending part of the optical disc 1 encased therein is exposed. The writing access opening 55 is provided to allow an external field-applying magnetic head of a recording and/or reproducing apparatus to approach the optical disc 1 for writing of an information signal to the latter. The writing access opening 55 is formed to a rectangular shape extending from near a center of the cartridge 54 to near a shorter front side of the cartridge 54. The writing access opening 55 is located with its longitudinal axis passing through the center of the optical disc 1 and a middle point $P_1$ of the front side width of the cartridge 54.

Also, the lower half 53 of the cartridge 54 has formed therein a reading/writing access opening 56 through which a radially extending part of the optical disc 1 encased therein is exposed and which allows an optical pickup unit of a recording and/or reproducing apparatus to approach the optical disc 1 for writing and reading of an information signal to and from the latter, and a central opening 57 through which the table-abutment 4 provided at the center of the optical disc 1 is exposed. The central opening 57 is formed at the center of the lower half 53, and the reading/writing access opening 56 is formed contiguously to the central opening 57 to have a rectangular shape extending to near the front side of the cartridge 54. As shown in FIG. 13, the reading/writing access opening 56 has a middle point $P_2$ of the width thereof deviated from the middle point $P_1$ of the front side width of the cartridge 54 towards one of the lateral sides of the cartridge 54. Owing to this deviation of the reading/writing access opening 56 from the center of the cartridge 54, the main body of the optical pickup unit can be displaced from the center line of the optical disc 1 with the optical axis of the objective lens positioned on the center line of the optical disc 1, so that the recording and/or reproducing apparatus compatible with the disc cartridge 51 can be designed more compact.

The cartridge 54 is provided with a shutter member 58 to open and close the writing access opening 55, reading/writing access opening 56 and central opening 57 at the same time. The shutter member 58 is made by punching and bending a thin metal sheet. It consists of a first shutter portion 59 to open and close the writing access opening 55, second shutter member 60 to open and close the reading/writing access opening 56 and central opening 57, and a juncture 61 to connect the bases of the first and second shutter portions 59 and 60. The shutter member 58 is formed to have a generally C-shaped cross-section. The juncture 61 has first and second projecting sliding guides 62 and 63 fitted on the front side of the cartridge 54. As shown in FIG. 12, the first shutter portion 59 is formed to have a rectangular shape having sufficient dimensions to close the writing access opening 55. As shown in FIG. 13, the second shutter portion 60 extends from the juncture 61 while being deviated laterally in relation to the first shutter portion 59 to close both the reading/writing access opening 56 formed off the center of the cartridge 54 and the central opening 57 formed at the center of the cartridge 54. Also the second shutter portion 60 is bent to close the central opening 57 which is positioned off the longitudinal axis of the reading/writing access opening 56.

The shutter member 58 is fitted onto the cartridge 54 with the first shutter portion 59 laid over the writing access opening 55 and the second shutter portion 60 laid over the reading/writing access opening 56 and central opening 57. At this time, the first and second sliding guides 62 and 63 of the shutter member 58 are engaged on the front side of the cartridge 54 with guide pieces thereof (not shown) engaged in sliding guide recesses, respectively, formed in the cartridge 54. The shutter member 58 thus installed on the cartridge 54 can be prevented from slipping off on the cartridge 54, and can be moved along the front surface of the cartridge in the directions of arrows A and B in FIGS. 12 and 13 to open and close the writing access opening 55, reading/writing access opening 56 and central opening 57 simultaneously.

There is provided inside the cartridge 54 a locking member (not shown) which engages with the shutter member 58 having been moved to a position where it closes the writing access opening 55, reading/writing access opening 56 and central opening 57, to thereby hold the shutter member 58 in that position. When the shutter member 58 is in the closed position, the locking member engages with a locking piece provided on the first sliding guide 62 to keep the shutter member 58 in the closed position.

When the disc cartridge 51 is ejected from a recording and/or reproducing apparatus, the shutter member 58 is held by a shutter holding member and moved in relation to the cartridge 54 to a position where it closes the reading/writing access opening 56 and central opening 57. Therefore, the disc cartridge 51 needs no forcing means such as a spring to move the shutter member 58 to the closed position.

The second shutter portion 60 formed long enough to close the reading/writing access opening 56 and central opening 57 has a free end thereof supported by a moving guide piece 60a fixed on the lower surface of the cartridge 54 as shown in FIG. 13. Thus the second shutter portion 60 is prevented from floating from the lower surface of the cartridge 54 and can positively close the central opening 57.

The cartridge 54 has formed on the front side thereof an engagement recess 64 in which a shutter releasing member provided in a recording and/or reproducing apparatus is engaged when the disc cartridge 51 is set in the recording and/or reproducing apparatus. The engagement recess 64 is open at one end thereof at which the disc cartridge 51 is first introduced into the recording and/or reproducing apparatus.

When the disc cartridge 51 thus constructed is introduced into a recording and/or reproducing apparatus first at one lateral side thereof at which the engagement recess 64 is open, namely, in the direction of arrow E in FIGS. 12 and 13, the shutter releasing member of the recording and/or reproducing apparatus enters the engagement recess 64, and presses to displace the locking member, thereby disengaging the latter from the locking piece of the shutter member 58. As the disc cartridge 51 is further inserted into the recording and/or reproducing apparatus after the locking piece is disengaged from the locking member, the cartridge 54 is moved while the shutter member 58 is restricted by the shutter releasing member from moving, so that the writing access opening 55, reading/writing access opening 56 and central opening 57 are opened. Thus the disc cartridge 51 is set in place in the recording and/or reproducing apparatus.

As shown in FIG. 13, the cartridge 54 has formed on the lower surface thereof first and second positioning holes 65 and 66 for receiving positioning pins provided in the recording and/or reproducing apparatus. The positioning holes 65 and 66 are formed in positions at the front corners, respectively, of the cartridge 54 at which the holes 65 and 66 are not opposite to the optical disc 1 encased in the cartridge 54.

The first disc cartridge 51 constructed as described in the above is formed to have a sufficient size to encase the optical disc 1 having a small diameter. The reading/writing access opening 56 is formed nearer to one lateral side of the cartridge 54. Therefore, along with the compact design of the disc cartridge 51, the recording and/or reproducing apparatus in which the disc cartridge 51 is to be used can be designed correspondingly compact.

Figure 14:
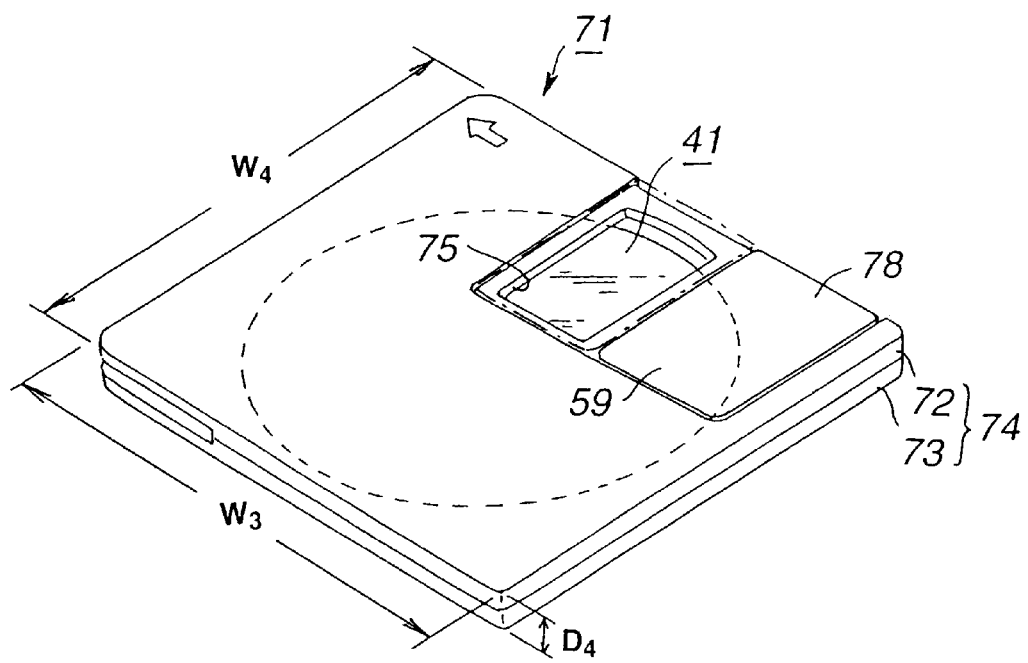
FIG. 14 is a perspective view of a second disc cartridge encasing the second optical disc.
Figure 15:
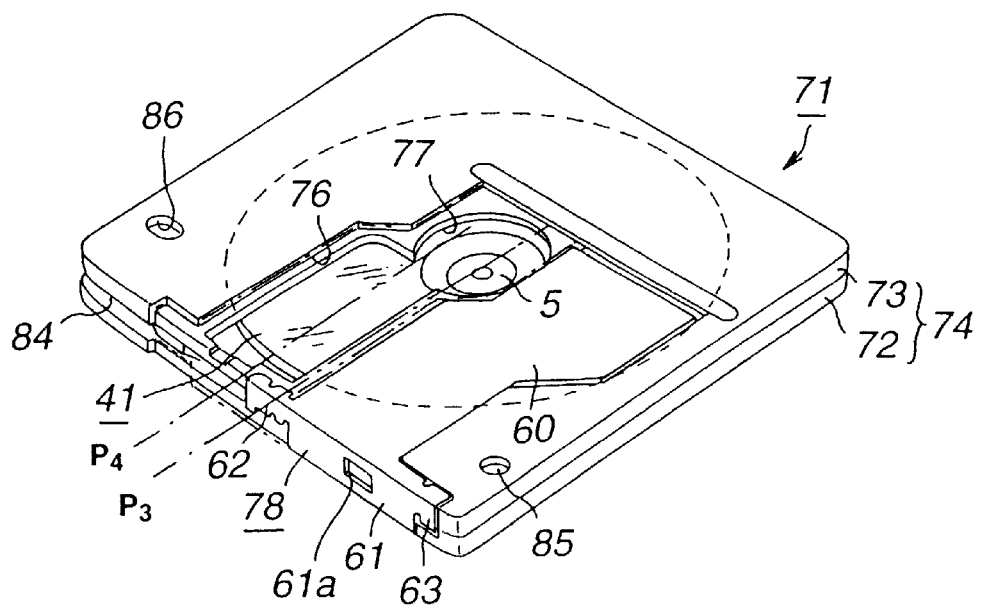
FIG. 15 is a perspective view of the second disc cartridge, showing the rear side thereof.

Referring now to FIGS. 14 and 15, there is illustrated a second disc cartridge according to the present invention, designed to encase the second optical disc according to the present invention, namely, the optical disc 41. The disc cartridge is generally indicated with a reference 71.

Similar to the first disc cartridge, namely, the disc cartridge 51 having been described in the foregoing, the disc cartridge 71 consists of an upper half 72 and lower half 73 butted to each other to form a cartridge 74 in which the disc cartridge 41 is to be encased. The cartridge 74 is formed to have a rectangular shape of which a first side has a length $W_1$ of 41 to 57 mm and a second side has a length $W_2$ of 41 to 62 mm, perpendicular to the first side. Therefore, the optical disc 41 of more than 38 mm and 52 mm or less in diameter can be encased rotatably in the cartridge 74. The lengths $W_1$ and $W_2$ of the first and second sides of the cartridge 74 are appropriately selected from ranges of 41 to 57 mm and 41 to 62 mm, respectively, according to the size of the optical disc 1 to be encased in the cartridge 54. The cartridge 54 has a thickness $D_4$ selected from a range of 3 to 6 mm according to the thickness of the optical disc 41 to be encased therein.

That is, the cartridge 74 is formed according to the size of the optical disc 41 to have the rectangular shape having minimum necessary length, width and thickness to encase the optical disc 41.

In effect, the disc cartridge 71 shown in FIGS. 14 and 15 comprises the cartridge 74 with a first side having a length $W_3$ of 54 mm, second side having a length $W_4$ of 57 mm and thickness $D_4$ of 5 mm, since the optical disc 41 to be encased therein has a diameter $R_{11}$ of 50 mm and thickness $D_{11}$ of 0.6 mm.

As in the disc cartridge 51, the cartridge 74 has formed in the upper half 72 thereof a writing access opening 75 through which a radially extending part of the optical disc 41 encased therein is exposed. Also, the lower half 73 of the cartridge 74 has formed therein a reading/writing access opening 76 through which a radially extending part of the optical disc 41 encased therein is exposed and which allows an optical pickup unit of a recording and/or reproducing apparatus to approach the optical disc 41 for writing and reading of an information signal to and from the latter, and a central opening 77 through which the table-abutment 4 provided at the center of the optical disc 41 is exposed. Similarly to the reading/writing access opening in the disc cartridge 51, the reading/writing access opening 76 has a middle point $P_4$ of the width thereof deviated from the middle point $P_3$ of the front side width of the cartridge 74 towards one of the lateral sides of the cartridge 74, as shown in FIG. 15.

The cartridge 74 is provided with a shutter member 78 to open and close the writing access opening 75, reading/writing access opening 76 and central opening 77 at the same time. The shutter member 78 is dimensioned differently from the shutter member of the disc cartridge 51 but constructed similarly to the latter. So, the same or similar elements as or to those of the shutter member of the disc cartridge 51 are indicated with the same reference numerals used for the latter and will not be described in further detail.

The cartridge 74 of the disc cartridge 71 has formed on the front side thereof an engagement recess 84 in which a shutter releasing member provided in a recording and/or reproducing apparatus is engaged when the disc cartridge 71 is set in the recording and/or reproducing apparatus. The engagement recess 84 is open at one end thereof at which the disc cartridge 71 is first introduced into the recording and/or reproducing apparatus.

When the disc cartridge 71 thus constructed is introduced into a recording and/or reproducing apparatus first at one lateral side thereof at which the engagement recess 84 is open, the shutter releasing member (not shown) of the recording and/or reproducing apparatus enters the engagement recess 84, and presses to displace the locking member (not shown), thereby disengaging the latter from the locking piece (not shown) of the shutter member 78. As the disc cartridge 71 is further inserted into the recording and/or reproducing apparatus after the locking piece is disengaged from the locking member, the cartridge 74 is moved while the shutter member 78 is restricted by the shutter releasing member from moving, so that the writing access opening 75, reading/writing access opening 76 and central opening 77 are opened. Thus the disc cartridge 71 is set in place in the recording and/or reproducing apparatus.

As shown in FIG. 15, the cartridge 74 has formed on the lower surface thereof first and second positioning holes 85 and 86 in which positioning pins provided in the recording and/or reproducing apparatus are engaged when the disc cartridge 71 is set in the recording and/or reproducing apparatus. The positioning holes 85 and 86 are formed in positions at the front corners, respectively, of the cartridge 74 at which the holes 85 and 86 are not opposite to the optical disc 41 encased in the cartridge 74.

The disc cartridge 71 is designed smaller than the disc cartridge 51 since it is used to encase the optical disc 41 smaller than the optical disc 1. However, since the optical discs 1 and 41 are identical to each other in the method of attaching each of them to the rotation driving mechanism of a recording and/or reproducing apparatus and the method of writing and reading an information signal to and from their signal recording layers, it is desirable for both the disc cartridges 51 and 71 to be usable commonly in the recording and/or reproducing apparatus which is compatible with at least the disc cartridge 51.

For selective use of the disc cartridges 51 and 71 of different sizes in a common recording and/or reproducing apparatus, it is necessary to provide the apparatus with a cartridge receiver or holder which can selectively position each of the disc cartridges 51 and 71 for attachment to the rotation driving mechanism.

A recording and/or reproducing apparatus for optical discs as recording media comprises an optical pickup unit and magnetic head unit moving over the upper and lower surfaces of the optical disc. Therefore, it is difficult to additionally provide a disc cartridge positioning mechanism within the reach of the optical pickup unit and magnetic head unit.

In such a situation, it should desirably be possible with only a minor modification of a recording and/or reproducing apparatus in which the disc cartridge 51 is usable, to set the disc cartridge 71 in place in the apparatus in a similar manner to that for setting the disc cartridge 51.

Figure 16:
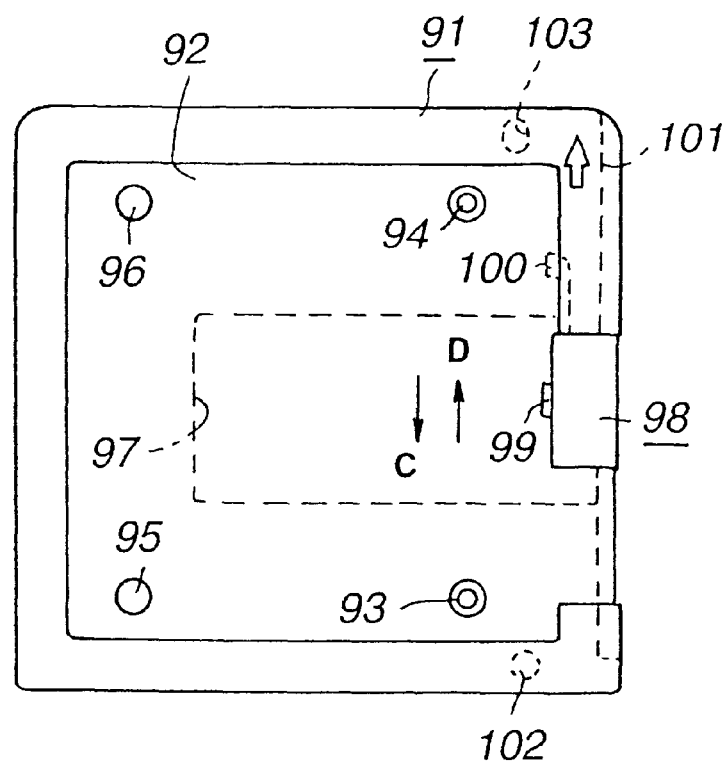
FIG. 16 is a plan view of an adapter used to allow the second disc cartridge to have same dimensions as the first disc cartridge.
Figure 17:
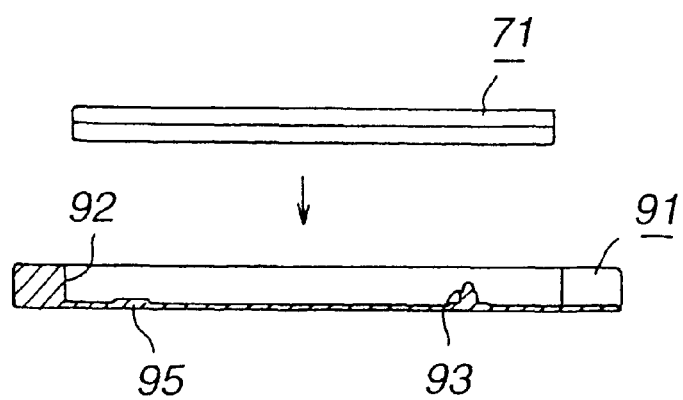
FIG. 17 is a sectional view of the adapter in FIG. 16.
Figure 18:
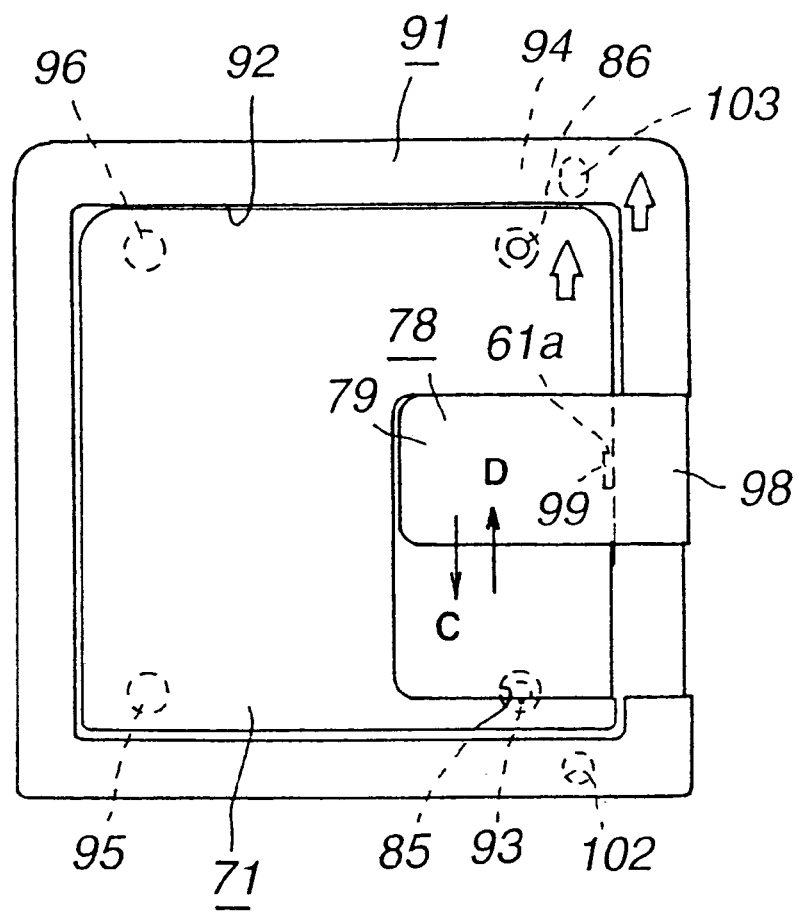
FIG. 18 is a plan view of the second disc cartridge set in the adapter.

To this end, the present invention provides also an adapter for use with both the disc cartridges 51 and 71 commonly in a recording and/or reproducing apparatus. FIGS. 16 to 18 show together the adapter. The adapter is generally indicated with a reference 91 and has the same size as the disc cartridge 51.

As shown in FIG. 16, the adapter 91 is designed to have a rectangular shape whose outside dimensions are same as those of the cartridge 54 of the disc cartridge 51. The adapter 91 has formed in the center thereof a cartridge holding concavity 92 to receive the disc cartridge 71. The concavity 92 has a sufficient size to receive the disc cartridge 71. The adapter 91 has formed, on the bottom of the concavity 92, first and second positioning pins 93 and 94, which engage the first and second positioning pin engagement holes 85 and 86, respectively, formed in the disc cartridge 71, as shown in FIGS. 16 and 17. Further, first and second projections 95 and 96 are formed on the bottom of the concavity 92 along a wall of the concavity 92 opposite to the wall along which the pins 93 and 94 are provided. The first and second projections 95 and 96 are provided to support the lower surface of the disc cartridge 71 and to level the latter in relation to the adapter 91.

Moreover, there is formed in the bottom of the concavity 92 an opening 97 through which the reading/writing access opening 76 and central opening 77, which is formed in the lower half of the disc cartridge 71 received in the adapter 91, are exposed.

Furthermore, the adapter 91 has provided at the front side thereof a shutter coupling member 98 which is connected to the shutter member 78 of the disc cartridge 71 set in the adapter 91. The shutter coupling member 98 is provided with an engagement projection 99 for engagement in the engagement hole 61a formed in the juncture 61 of the shutter member 78. The shutter member 78 is installed movably along the front side of the adapter 91 in the directions of arrows C and D in FIG. 16, which is the same as the moving direction of the shutter member 78. The shutter coupling member 98 is also provided with an engagement piece 100, which will be engaged with the shutter releasing member engagement recess 84 formed in the disc cartridge 71 set on the cartridge holding concavity 92.

Further, the adapter 91 has formed along the front side thereof a shutter releasing member engagement recess 101 similar to the shutter releasing member engagement recess 64 formed along the front side of the disc cartridge 51.

Moreover, the adapter 91 has formed on the lower surface thereof first and second positioning pin engagement holes 102 and 103 in positions, respectively, corresponding to the first and second positioning pin engagement holes 65 and 66 of the disc cartridge 51.

As shown in FIG. 18, the disc cartridge 71 is received in the adapter 91 thus constructed with the engagement projection 99 engaged in the engagement hole 61a of the shutter member 78, the engagement piece 100 engaged in the shutter releasing member engagement recess 84 and the first and second positioning pins 93 and 94 engaged in the first and second engagement holes 85 and 86, respectively. The disc cartridge 71 thus received in the adapter 91 will have the same shape as the disc cartridge 51. Namely, it can be handled similarly to the disc cartridge 51.

That is to say, the adapter 91 with the disc cartridge 71 set in the cartridge holding concavity 92 is introduced, first at the lateral side thereof perpendicular to the front side on which the shutter coupling member 98 is installed, into a recording and/or reproducing apparatus. As the adapter 91 is further inserted into the recording and/or reproducing apparatus, the shutter releasing member provided on the recording and/or reproducing apparatus enters the shutter releasing member engagement recess 101 to move the shutter coupling member 98 in the direction of arrow C in FIG. 18. As the shutter coupling member 98 is moved in the direction of arrow C in FIG. 18, the engagement piece 100 provided on the shutter coupling member 98 moves in the shutter releasing member engagement recess 84 of the disc cartridge 71 in the direction of arrow C to press and displace the locking member provided inside the disc cartridge 71. Thus the locking member is disengaged from the locking piece provided on the shutter member 78. As the adapter 91 is inserted further into the reading and/or reproducing apparatus after the disengagement of the locking member from the locking piece, the cartridge 74 is moved along with the adapter 91 with the shutter member 78 restricted by the engaging piece 100 from moving, so that the writing access opening 75, reading/writing access opening 76 and central opening 77 are opened. Thereafter, the adapter 91 is set together with the disc cartridge 71 held therein onto a cartridge mount in the recording and/or reproducing apparatus. The adapter 91 is correctly positioned on the cartridge mount since positioning pins provided in the recording and/or reproducing apparatus are engaged in the first and second positioning pin engagement holes 102 and 103, respectively.

It should be noted that to selectively set the disc cartridges 51 and 71 of different sizes in the recording and/or reproducing apparatus, a cartridge mount in which each of the disc cartridges 51 and 71 can be held may be provided in the apparatus. In this case, the cartridge mount is provided with positioning pins which are to be engaged in the first and second positioning pin engagement holes 65 and 66 in the disc cartridge 51, respectively, and those which are to be engaged in the first and second positioning pin engagement holes 85 and 86, respectively. To make it possible to selectively set the disc cartridges 51 and 71 in the recording and/or reproducing apparatus, there are formed in the disc cartridge 51, larger than the disc cartridge 71, relief holes in which the positioning pins are to be received in the first and second positioning pin engagement holes 85 and 86, respectively, in the disc cartridge 71.

As having been described in the foregoing, since the disc cartridges 51 and 71 encase the write/read optical discs 1 and 41, respectively, which are capable of recording an information signal, the cartridges 54 and 74 have formed in the upper half thereof the writing access openings 55 and 75 through which a magnetic head writes information to the respective exposed optical discs 1 and 41. However, a disc cartridge in which the read-only optical disc 111 is encased has no writing access opening formed in the upper half thereof, while having formed in the lower half thereof only a reading access opening, through which the optical pickup unit is exposed and a central opening through which the table-abutment thereof is exposed. Therefore, the disc cartridge encasing the read-only optical disc may have only a shutter for the reading access opening and central opening formed in the lower half thereof.

The disc cartridge 51 encasing the optical disc 1 and the disc cartridge 71 encasing the optical disc 41 are set in a recording and/or reproducing apparatus constructed as will be described below, to write and read information signal to and from the optical discs 1 and 41.

As mentioned above, the disc cartridge 71 is set in the adapter 91 and set as it is in the recording and/or reproducing apparatus. Similarly to the disc cartridges 51 and 71, the cartridge in which the read-only optical disc 111 is encased may be set in the recording and/or reproducing apparatus to read information signal recorded on the optical disc 111.

Figure 19:
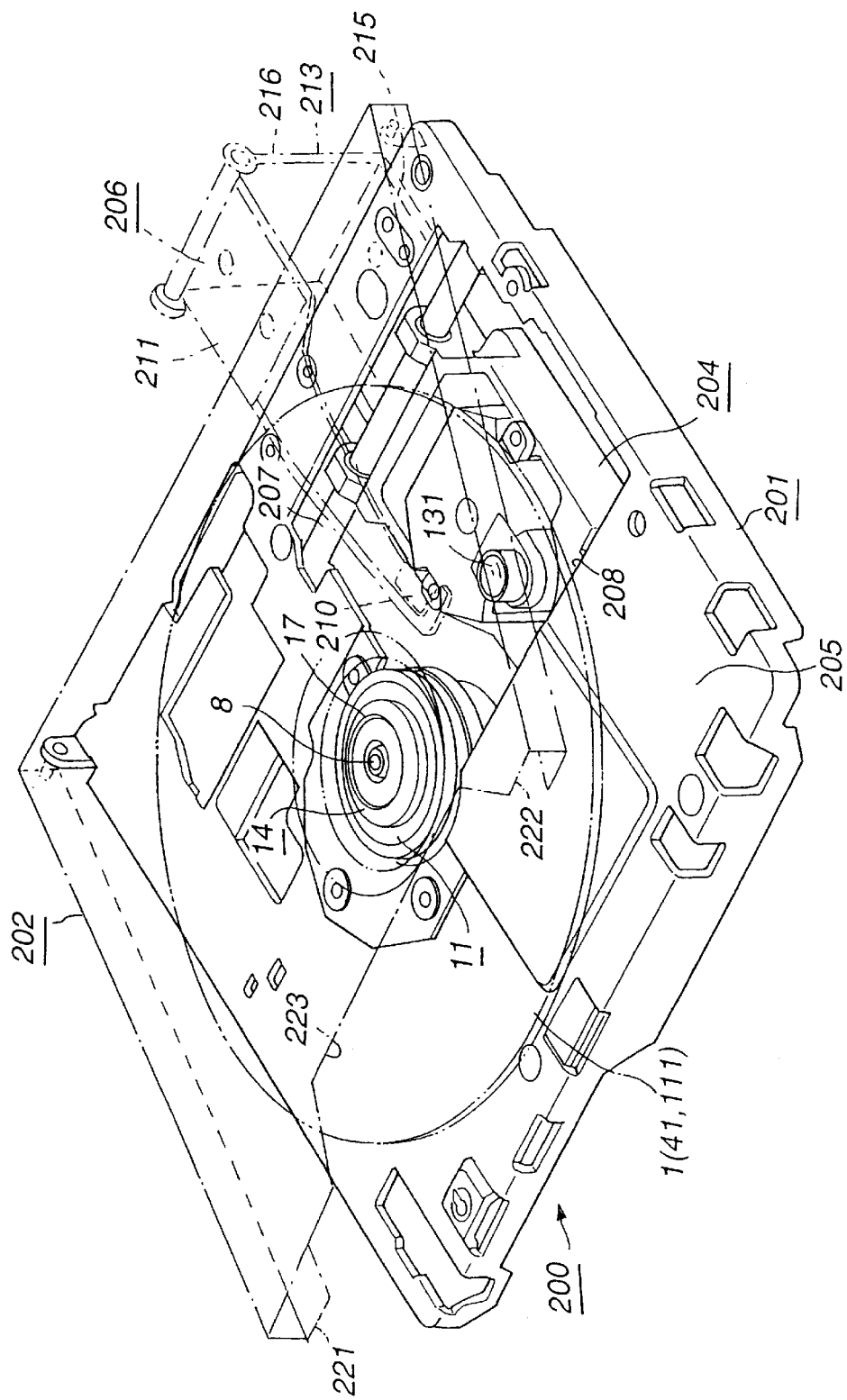
FIG. 19 is a perspective view of an optical recording and/or reproducing apparatus in which the optical disc according to the present invention is used.

Referring now to FIG. 19, there is schematically displayed a recording and/or reproducing apparatus in which each of the disc cartridges 51 and 71 and a disc cartridge encasing the read-only optical disc 111 is usable. The recording and/or reproducing apparatus is generally indicated with a reference 200. As shown, the disc cartridge 51, the disc cartridge 71 set in the adapter 91 or the disc cartridge encasing the read-only optical disc 111 is set in the recording and/or reproducing apparatus 200 to write information signals such as audio signal, video signal, etc. and read an information signal recorded in the optical disc. The recording and/or reproducing apparatus 200 comprises a magnetic head unit to apply an external magnetic field to the magneto-optical disc when writing information signal to the latter.

As shown in FIG. 19, the recording and/or reproducing apparatus 200 comprises a housing, a flat, generally rectangular base 201 formed from a metallic material and disposed in the housing, and a cartridge holder 202 to hold a disc cartridge. The cartridge holder 202 is supported pivotably on the base 201. The base 201 has incorporated therein a rotation driving mechanism 11 which drives to spin the optical disc 1 (41 or 111) and an optical pickup unit 203. There is provided on the base 201 a cartridge mount 205 on which a disc cartridge (not shown) held in the cartridge holder 202 is set. The cartridge holder 202 has disposed thereon a magnetic head unit 206 which is moved synchronously with the optical pickup unit 204 radially of the optical disc 1.

The rotation driving mechanism 11 is constructed as having previously been described with reference to FIG. 4.

As shown in FIG. 19, the optical pickup unit 204 comprises mainly a semiconductor laser to emit a light beam, an objective lens 131 to focus the light beam emitted from the semiconductor laser onto the optical disc 1, a photodetector to detect a return light from the optical disc 1 in order to detect an information signal and control signals, etc. The optical pickup unit 204 is supported at both sides thereof by a pair of guide shafts 207 installed in parallel to each other on the bottom of the base 201 to be movable radially of the optical disc 1 set on the disc table 14. The objective lens 131 faces the upper surface of the base 201 and the optical disc 1 set on the disc table 14 through an opening 208 formed in the base 201. The optical pickup unit 204 is guided on the guide shafts 207 by a feed screw (not shown) driven by a drive motor (not shown) fixed on the bottom of the base 201, and thus moved radially of the optical disc 1 on the disc table 14. That is, to write or read an information signal, the optical pickup unit 204 is moved radially from the lead-in area towards the lead-out area of the optical disc 1.

As shown also in FIG. 19, the magnetic head unit 206 is linked with the optical pickup unit 204, which writes an information signal to the optical disc 1. Namely, the magnetic head unit 206 is also moved radially of the optical disc 1 on the disc table 14 as the optical pickup unit 204 is so moved. The magnetic head unit 206 comprises a magnetic head 210 to apply to the optical disc 1 with an external magnetic field modulated according to an information signal to be written to the optical disc, and a magnetic head supporting plate 211 provided with a leaf spring supporting at the free end thereof the magnetic head 210 and which can elastically be displaced. The magnetic head unit 206 is linked with the optical pickup unit 204 by a linkage member 213 in such a manner that it is positioned in a position where it will be opposite to the optical pickup unit 204 with the optical disc 1 on the disc table 14 located between them.

As shown in FIG. 19, the linkage member 213 consists of a coupling piece 215 and a fixture 216 formed by bending one end of the coupling piece 215 perpendicularly to the latter itself and by which the linkage member 213 is fixed to the optical pickup unit 204. The linkage member 213 is formed to have a generally L shape. The linkage member 213 is installed to the optical pickup unit 204 with the fixture 216 fixed to the optical block with fixing screws or the like so that the free end of the coupling piece 215 projects above the base 201. The base end of the magnetic head supporting plate 211 is pivotably supported on the other end of the coupling piece 215 by means of a pivot (not shown). Thus the magnetic head supporting plate 211 is pivotable about the pivot in directions of the magnetic head 210 supported at the free end of the plate 211 being turned towards and away from the optical disc 1 on the disc table 14.

As the optical pickup unit 204 is driven by the feeding motor to move radially of the optical disc 1, the magnetic head unit 206 thus coupled to the optical pickup unit 204 by means of the linkage member 213 is also moved along with the optical pickup unit 204 radially of the optical disc 1.

As shown in FIG. 19, the cartridge holder 202 in which the disc cartridge is inserted and held is pivotally installed to the base 201 in a position between the base 201 and magnetic head unit 206. The cartridge holder 202 has provided at opposite lateral sides thereof cartridge guides 221 and 222 to guide and hold a disc cartridge, and also has a cartridge inlet 223 formed at the front side thereof. A disc cartridge inserted from the cartridge inlet 223 into the cartridge holder 202, is held at opposite lateral sides thereof by the cartridge guides 221 and 222, respectively.

The recording and/or reproducing apparatus 200 with the rotation driving mechanism 11 constructed as mentioned above works as will be described below when the disc cartridge 51 encasing the optical disc 1, for example, is set therein:

First, to write an information signal to the optical disc 1 or to read an information signal recorded on the optical disc 1, the cartridge holder 202 is pivoted to its upper position where it is apart from the cartridge mount 205. At this time, the cartridge inlet 223 of the cartridge holder 202 will be directed to above the apparatus. Then, the cartridge holder 202 in which the disc cartridge is held is pivoted towards the cartridge mount 205 and thus the disc cartridge 51 is positioned in place on the cartridge mount 205.

At this time, the optical disc 1 in the disc cartridge 51 is set on the disc table 14 of the rotation driving mechanism 11 and clamped there for rotation with the disc table 14. When it is detected that the disc cartridge set on the cartridge mount 205 encases the optical disc 1 and the write mode of operation is selected by using a record button, the spindle motor 12 is driven to spin forward and the optical disc 1 is spun along with the disc table 14. The optical pickup unit 204 is put into operation. A light beam emitted from a light source scans over the signal recording layer 21 of the optical disc from the lead-in to lead out while the magnetic head 210 applies the optical disc 1 with an external magnetic field modulated according to an information signal to be written. Thus, a desired information signal is written to the optical disc 1.

When the read mode of operation is selected by using a play button, a light beam emitted from the semiconductor laser of the optical pickup unit 204 is irradiated to the signal recording layer 21 of the optical disc 1, a return light from the signal recording layer 21 of the optical disc 1 is detected by the photodetector of the optical pickup unit 204. Thus, an information signal is read from the optical disc 1. It should be noted that for information signal reading, no external magnetic field may be applied to the optical disc 1, namely, the magnetic head unit 206 is not required.

In the above-mentioned recording and/or reproducing apparatus 200, the optical pickup unit 204 emits a light beam which enables a high density recording as having previously been described. A semiconductor laser emitting a light beam of 380 to 420 nm in wavelength $\lambda$ or a light beam of 630 to 670 nm in wavelength $\lambda$ is used as the laser source. The objective lens 131 has a numerical aperture NA of 0.5 to 0.7 to permit a high resolution. The magnetic head 210 is a high frequency type one to enable a high density recording.

In addition to the first disc cartridge 51 encasing the first optical disc 1, the second disc cartridge 71 encasing the second optical disc 41 or the disc cartridge in which the read-only optical disc 111 is encased can be used in the recording and/or reproducing apparatus to write or read an information signal in the same manner as mentioned above.

As having been described in the foregoing, since the optical recording medium and the disc cartridge encasing the optical recording medium according to the present invention are very compact and able to an record information signal with a high density, a recording and/or reproducing apparatus can be provided which is correspondingly compact and can write or read an information signal such as audio and video information for a sufficiently long time.

Although modifications and changes may be suggested by those of ordinary skill in the art, it is the intention of the inventors to embody within the patent warranted hereon all changes and modifications as reasonably and properly come within the scope of their contribution to the art.

We claim as our invention:

1. An optical read/write recording medium comprising:

a disc shape with a diameter of 65 mm or less and a thickness of 0.4 to 0.7 mm;

a recording area on the read/write recording medium extending outwardly from a radial position 12.5 mm or less from the center of the read/write recording medium; and a ratio between the recording area and a non-recording area on the read/write recording medium being 3.4 or more;

a storage capacity of at least 2 GB or more; and a center hole formed at the center of the read/write recording medium around which there is adjacently formed an annular table-abutment integral to the medium and being convex to one side of the medium, the annular table-abutment having a recessed portion having a surface that faces away from the one side of the medium and recessed toward the one side of the medium, a magnetic-clamping hub being fixed to the surface of the recessed portion of the annular table-abutment, the hub having a flange portion fixed to the surface of the recessed portion of the table-abutment that faces away from the one side of the medium and a depressed portion depressed from the flange portion into the center hole toward the one side of the medium, a height of the hub from a lower surface of the depressed portion to an upper surface of the flange portion being smaller than a thickness of the table-abutment.

2. The optical read/write recording medium according to claim 1, wherein the annular table-abutment is convex by 0.4 mm to 0.7 mm and has an outside diameter of about 14 mm and an inside diameter of about 8 mm.

* * * * *